United States Patent [19]

Chieh

[11] Patent Number: 6,154,293

[45] Date of Patent: Nov. 28, 2000

[54] DEVICE FOR SETTING CONTROL PARAMETERS OF IMAGE INPUT/ PROCESSING APPARATUS

[76] Inventor: Jui-Nu Chieh, 6F, No. 152, TaiTung Road, ChungLi City, TaoYuan Hsien, Taiwan

[21] Appl. No.: 09/136,658

[22] Filed: Aug. 19, 1998

[51] Int. Cl.$^7$ ..................................... H04N 1/04
[52] U.S. Cl. ......................... 358/474; 358/486; 358/497; 358/406
[58] Field of Search ................................... 358/504, 505, 358/406, 468, 474, 494, 497; 382/112, 114; 399/38, 39

[56] References Cited

U.S. PATENT DOCUMENTS 4,698,669 10/1987 Sekizawa et al. ....................... 358/505
5,970,181 10/1999 Ohtsu ...................................... 382/274

Primary Examiner—Cheukfan Lee

[57] ABSTRACT

A control parameter setting device to be incorporated in an image input/processing apparatus which includes a casing having an inside surface having a first color. An elongated channel is formed on the casing to movably receive therein a user-setting member which has a user accessible knob or switch exposed outside the channel to allow a user to move the user-setting member between at least two predetermined positions along the channel, each corresponding to a predetermined set of control parameters of the image input/ processing apparatus, and an inside casing extension which is located inside the casing and movable by the user accessible knob. The extension has an inward facing surface having a second color which is significantly contrasty to the first color so that they are optically different remarkably. A scanning element is disposed inside the casing to scan the inward facing surface of the extension of the user-setting member and to determine the position thereof by means of the color contrast so that by having the scanning element to scan the extension of the user-setting member and determine the position thereof before a scanning operation is performed, the predetermined set of control parameters may be loaded into the image input/processing apparatus first before the scanning operation is started and the scanning operation may be performed properly.

3 Claims, 6 Drawing Sheets

DEVICE FOR SETTING CONTROL PARAMETERS OF IMAGE INPUT/PROCESSING APPARATUS

FIELD OF THE INVENTION

The present invention relates generally to an image input/processing apparatus, such as scanner, facsimile and copy machine that comprises a scanning element to scan the image on a document in order to input/read and process the image and in particular to a device to be incorporated in the image input/processing apparatus for user setting the control parameters of the apparatus in a simple and ready fashion.

BACKGROUND OF THE INVENTION

With the development of information industry, apparatus for inputting and processing image is now more and more important in information processing. Examples of the image input/processing apparatus are scanner, facsimile machine and copy machine which all possess an optic scanning element to project a light beam onto a document to be read and receive the reflected beam to obtain the image on the document. Some of these devices are divided into (1) flat bed type which has a scanning window on which the document to be scanned is supported with the scanning element being movable to scan through the whole window in order to obtain the complete image on the document and (2) paper feed-in type which comprises an opening (usually elongated) to feed the document to be scanned into the apparatus in which a scanning element is fixed, the document being moved to pass through the scanning element in order to have the whole document scanned by the scanning element. The image after having been scanned and read by the apparatus is processed for further use.

The image input/processing apparatus usually requires a user to set the operation parameters of the apparatus first before a scanning operation is performed. Usually, there are two ways to set up the apparatus. The first one is using a computer to which the image input/processing apparatus is connected to set the control parameters. Another way is using a plurality of switches provided on the apparatus. Both ways require sophisticated operation which may be difficult to the general consumers.

Thus, it is desirable to have a control parameter setting device to be incorporated in an image input/processing apparatus which allows the user to readily and easily set the control parameters of the image input/processing apparatus.

SUMMARY OF THE INVENTION

Therefore, an object of the present invention is to provide a control parameter setting device to be incorporated in an image input/processing apparatus which may be operated in a ready and easy way so that the control parameters may be set without sophisticated operation.

Another object of the present invention is to provide a control parameter setting device which is simple in construction and thus cheap in cost so that a low cost and efficient way for setting the control parameters of an image input/processing apparatus may be obtained.

To achieve the above objects, in accordance with the present invention, there is provided a control parameter setting device to be incorporated in an image input/processing apparatus which comprises a casing having an inside surface having a first color. An elongated channel is formed on the casing to movably receive therein a user-setting member which has a user accessible knob or switch exposed outside the channel to allow a user to move the user-setting member between at least two predetermined positions along the channel, each corresponding to a predetermined set of control parameters of the image input/processing apparatus, and an inside casing extension which is located inside the casing and movable by the user accessible knob. The extension has an inward facing surface having a second color which is significantly contrasty to the first color so that they are optically different remarkably. A scanning element is disposed inside the casing to scan the inward facing surface of the extension of the user-setting member and to determine the position thereof by means of the color contrast so that by having the scanning element to scan the extension of the user-setting member and determine the position thereof before a scanning operation is performed, the predetermined set of control parameters may be loaded into the image input/processing apparatus first before the scanning operation is started and the scanning operation may be performed properly.

BRIEF DESCRIPTION OF THE DRAWINGS

The present invention will be better understood from the following description of preferred embodiments thereof, with reference to the attached drawings, wherein.

DETAILED DESCRIPTION OF THE PREFERRED EMBODIMENTS

Figure 1:
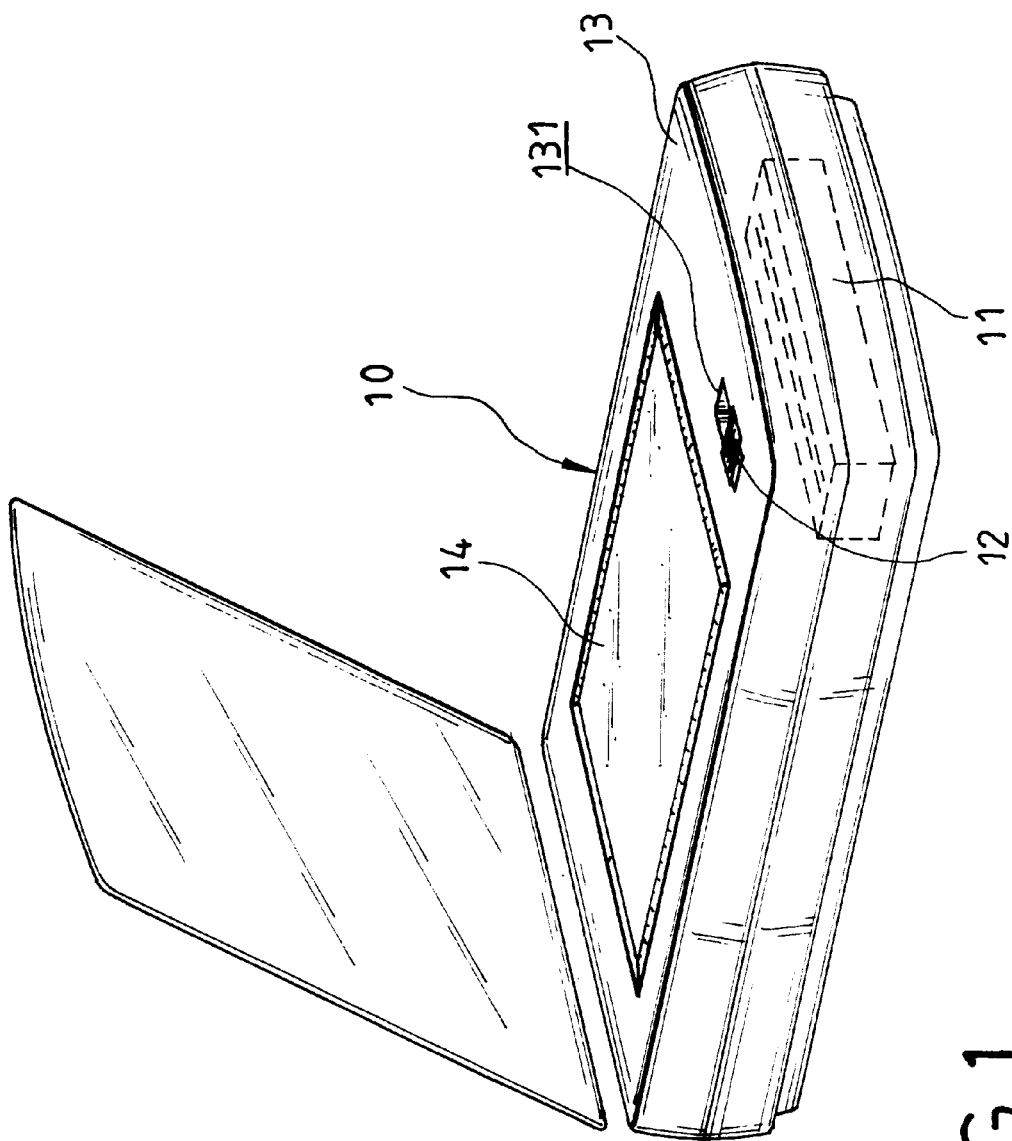
FIG. 1 is a perspective view showing a flat bed scanner into which a control parameter setting device in accordance with the present invention is incorporated to serve as a first embodiment of the present invention.
Figure 3:
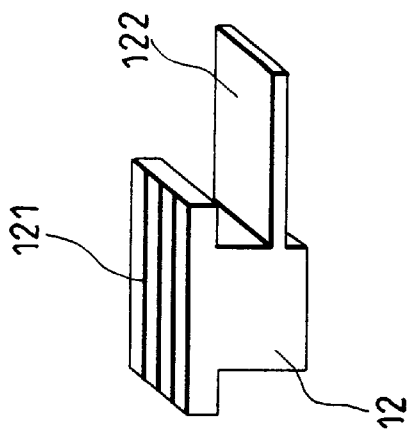
FIG. 3 is a perspective view of a user-setting member of the control parameter setting device of the present invention.

With reference to the drawings and in particular to FIG. 1, which show a flat bed scanner designated at 10 comprising a casing 13 on which a scanning window 14 for supporting thereon a document (not shown in FIG. 1) to be scanned/read, the flat bed scanner 10 serves as an image input/processing apparatus of a first application in which a control parameter setting device in accordance with the present invention may be incorporated. The control parameter setting device of the present invention comprises a movable, user-setting member 12 (also see FIGS. 2 and 3) which is movably received with an elongated channel 131 formed on the casing 13 of the image input/processing apparatus (the flat bed scanner) 10 so that the user-setting member 12 is positionable at least on two positions along the channel 131.

A user accessible knob or sliding switch 121 (see FIGS. 2 and 3) is provided on the user-setting member 12 which is exposed outside the channel 131 and accessible to a user for allowing the user to move the user-setting member 12 along the channel 131 between the at least two positions.

Figure 2:
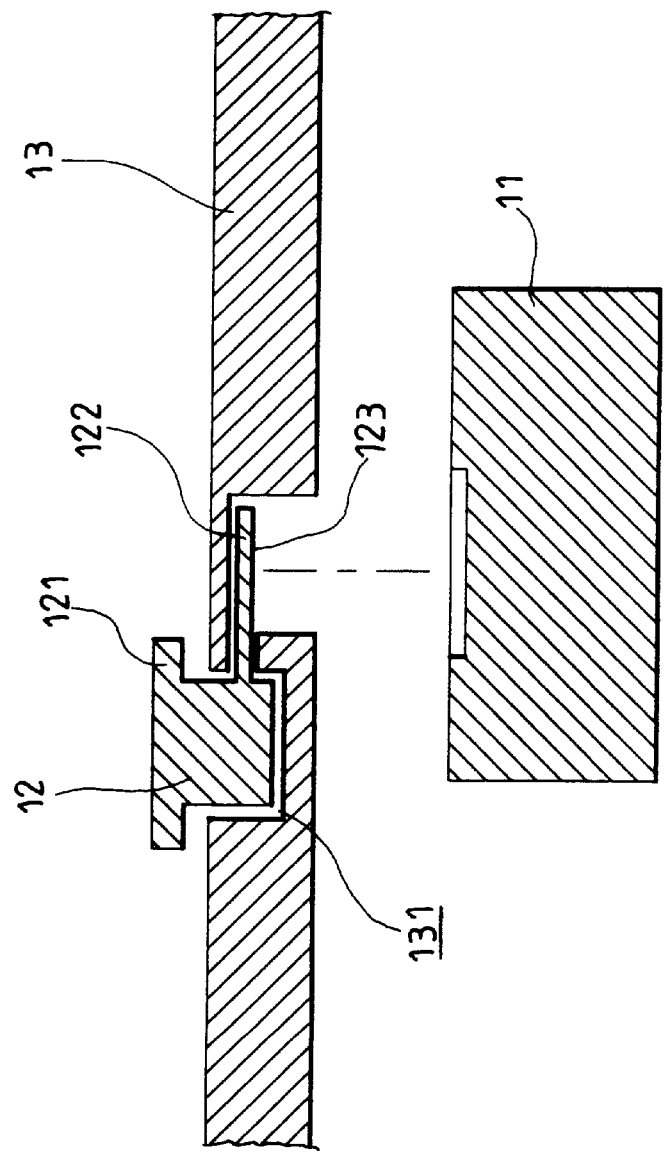
FIG. 2 is a cross-sectional view of the flat bed scanner particularly illustrating the control parameter setting device of the present invention.

The user-setting member 12 comprises an inside casing extension 122 preferably in the form of a plate having an inward facing surface 123 (see FIG. 2). The channel 131 of the casing 13 is formed in such a way to allow the extension 122 of the user-setting member 12 to extend into the casing 13 to have the inward facing surface 123 facing inward inside the casing 13. The channel 131 and the extension 122 are positioned and sized to allow the extension 122 of the user-setting member 12 to be scanned by a scanning element 11 disposed inside the scanner 10. The scanning element 11 may be an additional part to the image input/processing apparatus, but preferably the scanning element 11 is the scanning element that is used by the image input/processing apparatus to read image on the document placed on the scanning window 14 so that no additional parts and cost are needed.

Preferably, the scanning element 11 comprises a charge couple device (CCD) or a contact image sensor.

In accordance with the present invention, the inward facing surface 123 of the extension 122 of the user-setting member 12 is provided with a color that is contrasty to the color of the casing 13 (with the casing color serving as the background color) so that a significant difference in color may be recognized by the scanning element 11 when the scanning element 11 scans the inward facing surface 123 of the extension 122. In other words, the inward facing surface 123 of the extension 122 of the user-setting member 12 is remarkably different from the casing 13 in color contrast. This allows the scanning element 11 to determine the position of the user-setting member 12 along the channel 131. An example of the color of the inward facing surface 123 of the extension 122 of the user-setting member 12 is that in case the casing 13 which is usually made of plastic materials or similar materials is made black, then the inward facing surface 123 of the extension 122 may have the color of white. This provides a very significant contrast between the user-setting member 12 and the casing 13 of the image input/processing apparatus 10.

Figure 4:
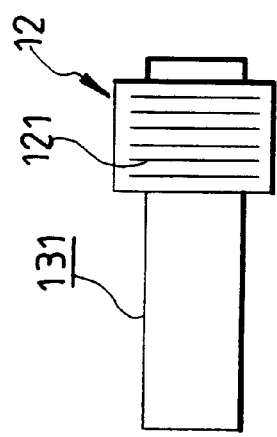
FIG. 4 is top view showing the user-setting member is located at a first position along a channel formed on the casing of the flat bed scanner which provides a first output signal corresponding to a first set of control parameters of the flat bed scanner.
Figure 4A:
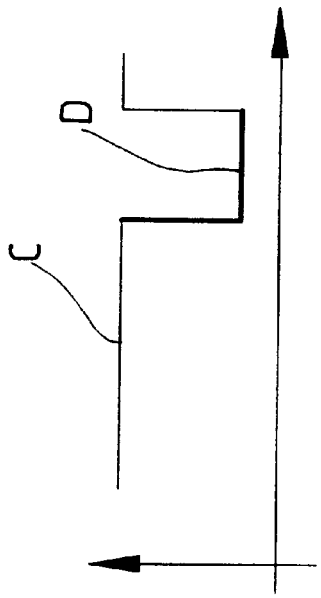
FIG. 4A is a graphic representation of the first output signal generated by the control parameter setting device of the present invention when the user setting member is located at the first position as shown in FIG. 4.
Figure 5:
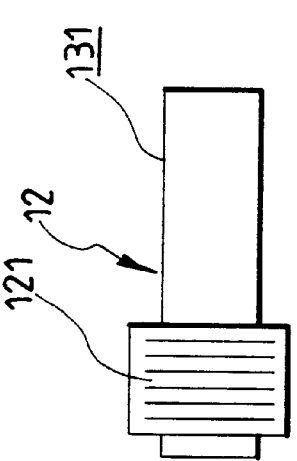
FIG. 5 is top view showing the user-setting member is located at a second position along a channel formed on the casing of the flat bed scanner for comparison with the first position shown in FIG. 4, the second position providing a second output signal corresponding to a second set of control parameters of the flat bed scanner.
Figure 5A:
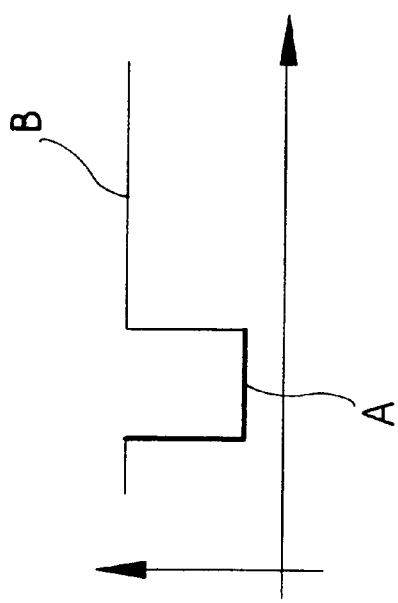
FIG. 5A is a graphic representation of the second output signal generated by the control parameter setting device of the present invention when the user setting member is located at the second position as shown in FIG. 5.

In FIGS. 4 and 5, it is shown that the user-setting member 12 is positioned at two ends (the first position and the second position) of the channel 131 of the casing 13 and the resultant signals of scanning performed by the scanning element 11 for these two positions are respectively shown in FIGS. 4A and 5A. In FIG. 4A, the first output signal corresponding to the first position of FIG. 4 is shown in which the reference character A indicates the user-setting member 12 and B the casing 13. In FIG. 5A, the second output signal corresponding to the second position of FIG. 5 is shown in which the reference character C indicates the user-setting member 12 and D the casing 13. The signals shown in FIGS. 4A and 5A allow the scanning element 11 or the associated circuit thereof to determine the position of the user-setting member 12. By providing a suitable circuit associated with the scanning element 11, the control parameters associated with each of the positions of the user-setting member 12 may be loaded into the image input/processing apparatus 10. In other words, each of the positions of the user-setting member 12 along the channel 131 has a predetermined set of control parameters which controls the operation of the image input/processing apparatus 10 associated therewith and the sets of control parameters may be readily and easily selected by user by moving the user accessible switch 121 between the positions which allows the user to efficiently and effectively load the desired control parameters into the image input/processing apparatus 10 to properly control the operation thereof.

The sets of control parameters may be pre-established and stored in any suitable storage device, such as electronic memory.

Quite apparently, there may be more than two sets of pre-established control parameters respectively associated with more than two positions of the user-setting member 12 along the channel 131 so that a user may select any one of the sets of control parameters by moving the user-setting member 12 to an associated position along the channel 131 and no cumbers one and complicated actuation of a plurality of switches or operating a computer is needed.

The control parameters discussed herein comprises at least for example magnification scale of the scanned document, DPI (dot per inch) value, size of document to be scanned, and gray level, but not limited thereto.

Figure 6:
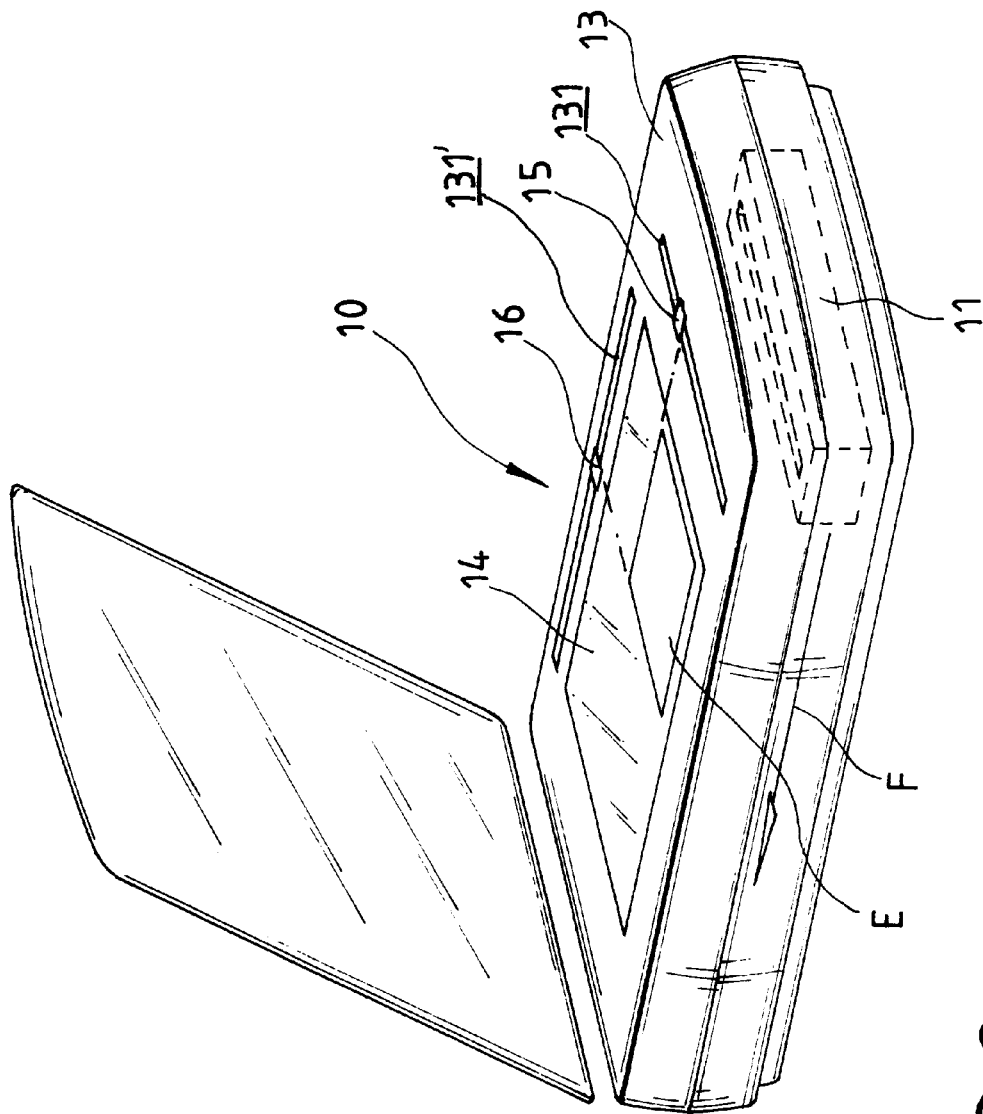
FIG. 6 is a perspective view showing a flat bed scanner into which two control parameter setting devices in accordance with the present invention are incorporated to serve as a second embodiment of the present invention wherein the two control parameter setting devices are used to determined the area occupied by a document to be scanned.

For example, in the application shown in FIG. 6 wherein two control parameter setting devices of the present invention are incorporated in a flat bed scanner 10 which has a rectangular scanning window 14 on which a document to be scanned, designated with reference character E, is supported, the casing 13 of the scanner 10 is provided with two elongated channels 131 and 131' respectively along two adjacent sides of the rectangular scanning window 14. The scanning element 11 is the scanning element of the scanner 10 for scanning the document E. The two channels 131 and 131' respectively have a user-setting member 15 or 16 movably received therein to allow the user to move the user-setting members 15 and 16 to the positions corresponding to the size of the document E as shown in FIG. 6. In performing scanning operation, the scanning element 11 is driven by a suitable electrical and mechanical system to move in the direction of arrow F (namely the lengthwise direction of channel 131') and a linear scanning operation is performed by the scanning element 11 in a direction substantially normal to the direction F (namely, the lengthwise direction of channel 131). Thus, the detection of the two user-setting members 15 and 16 by the scanning element 11 allows the scanner 10 to determine the size of the document E and thus the distance of travel of the scanning element 11 and the spatial range of linear scanning operation performed by the scanning element 11. There would be no need for the scanning element 11 to scan the whole scanning window 14 which is usually done in the prior art technique.

Figure 7:
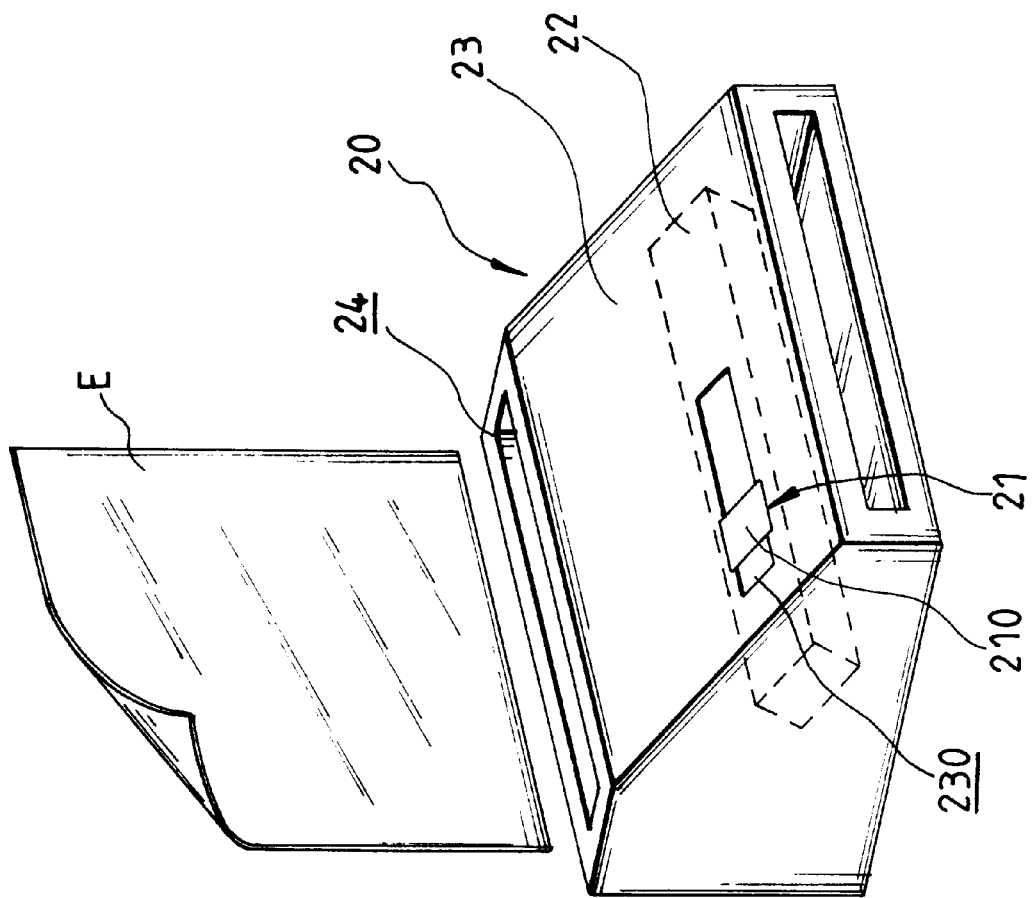
FIG. 7 is a perspective view showing a facsimile machine into which a control parameter setting device in accordance with the present invention is incorporated to serve as a third embodiment of the present invention wherein the control parameter setting device may be used to select between the color transmission mode and the black/white transmission mode.
Figure 9:
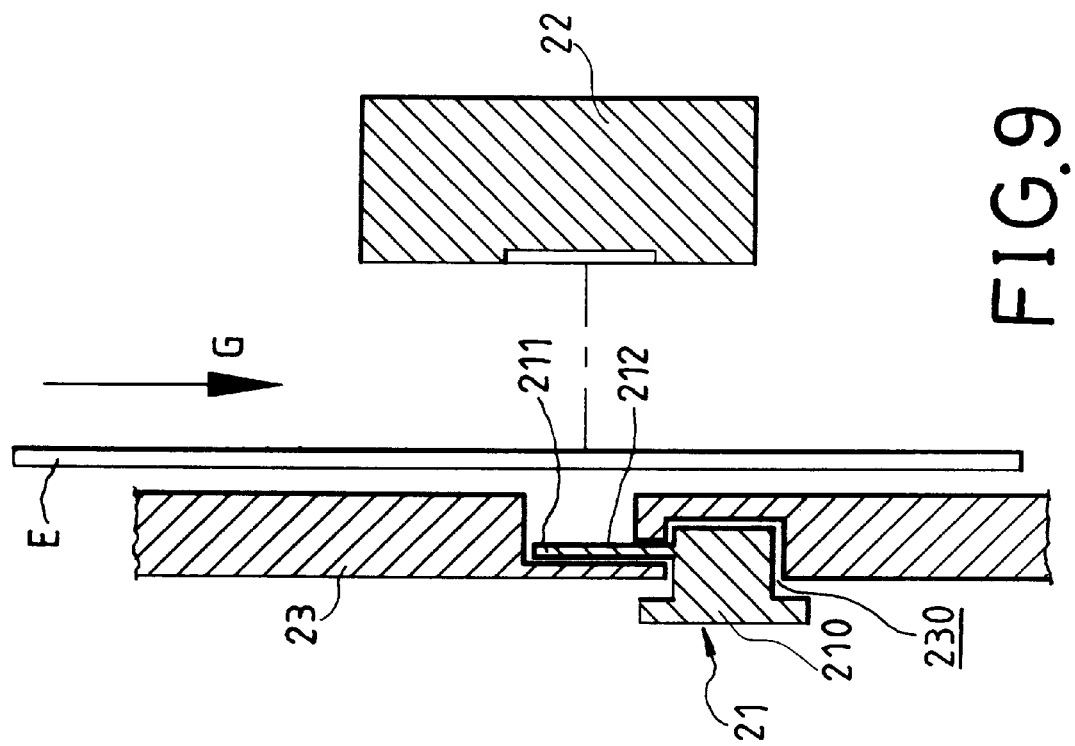
FIGS. 8 and 9 are cross-sectional views showing the operation of the facsimile machine illustrated in FIG. 7.
Figure 8:
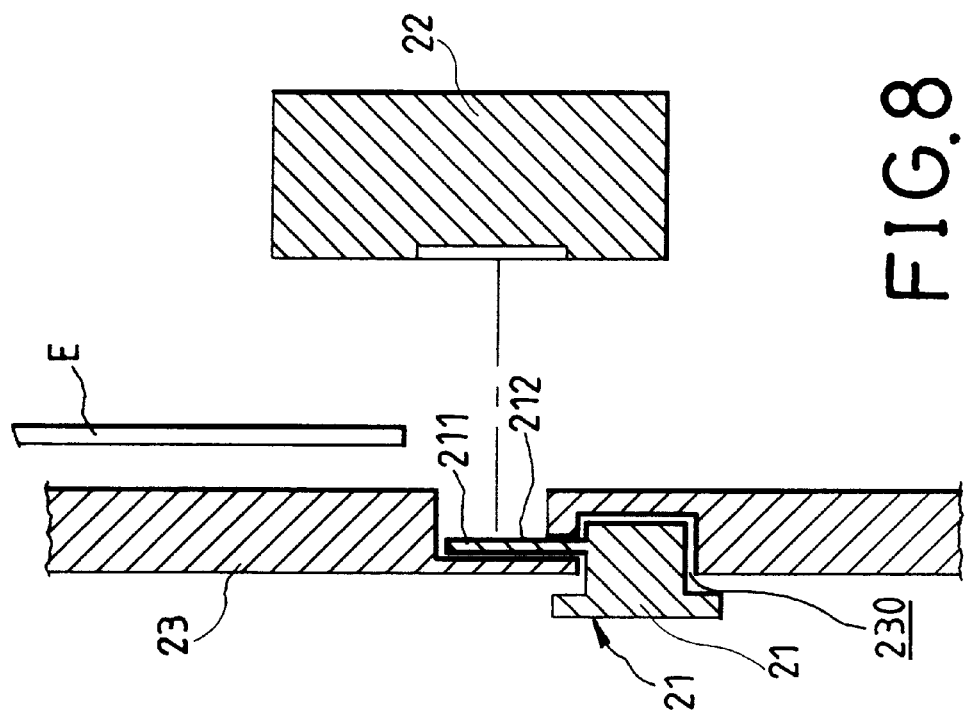

FIGS. 7–9 shows another application of the control parameter setting device of the present invention in which the control parameter setting device is incorporated in a paper feed-in type image input/processing apparatus 20, such as a facsimile machine shown in the drawings, the image input/processing device (facsimile machine) 20 has a casing 23 on which a feed-in opening 24 is formed through which a document E (see FIGS. 8 and 9) may be fed into the facsimile machine 20 in the direction indicated by arrow G in FIG. 9 so as to allow the document E to pass through a scanning element 22 disposed inside the image input/processing apparatus 20. The control parameter setting device of the present invention comprises a user-setting member 21 which is movably received in an elongated channel 230 formed on the casing 23 of the image input/processing apparatus 20 in such a way that a user accessible knob or switch 210 is exposed outside the casing 23 to be accessible by the user and an extension 211 located inside the casing 23 with an inward facing surface 212 confronting the scanning element 22 so that before the document E passes through the scanning element 22, the scanning element 22 may scan the inward facing surface 212 first to obtain the control parameters related to the position of the user-setting member 21. As mentioned previously, a significant color contrast is provided between the casing 23 and the inward facing surface 212 of the extension 211 of the user-setting member 21 to enhance the determination of the position of the user-setting member 21.

In the embodiment illustrated in FIGS. 7–9, the user accessible switch 210 is provided to be positionable at two ends of the channel 230 which respectively indicate color transmission mode and black/white transmission mode of the facsimile machine 20. Thus, the user may easily select to have the facsimile machine 20 operated in a color transmission mode or a black/white transmission mode by moving the switch 21 along the channel 230 which is a simple and ready operation that can be carried out by the user. By this way, the facsimile machine 20 is set to the desired mode (color or black/white) before the document E is scanned/read by the scanning element 22.

A method for setting control parameters of an image input/processing apparatus is also provided which comprises the steps of:

(1) providing a user-setting member which is movably received within an elongated channel formed on a casing of the image input/processing apparatus, the user-setting member being movable between at least two positions along the channel and the user setting member having a first color provided on a surface thereof which first color is in significant color contrast with respect to a second color of the casing;

(2) establishing and storing a plurality of sets of control parameters, each being associated with one of the positions of the user-setting member along the channel;

(3) providing a scanning element inside the casing and confronting the surface of the user-setting member to scan the surface of the user-setting member and thus determine the position of the user-setting member by means of the color contrast;

(4) retrieving the set of control parameters corresponding to the position of the user-setting member determined by the scanning element; and (5) loading the control parameters into the image input/processing apparatus.

Although the preferred embodiments and some applications thereof have been described to illustrate the present invention, it is apparent to those skilled in the art that changes and modifications in the specifically described embodiments and applications can be carried out without departing from the scope of the present invention which is intended to be limited only by the appended claims.

What is claimed is:

1. A control parameter setting device adapted to be incorporated in an image input/processing apparatus having a plurality of pre-established sets of control parameters and comprising a casing having a background color inside which a scanning element is disposed, the control parameter setting device comprising a movable member which is movably received within an elongated channel formed on the casing to be movable between at least two positions along the channel, each of the positions being associated with one of the plurality of pre-established sets of control parameters of the image input/processing apparatus, the movable member having a position determining means which cooperates with the scanning element to determine the position of the movable member along the channel so as to load the associated set of control parameters into the image input/processing apparatus, wherein the position determining means comprises an inside casing extension of the movable member which extends into the casing and has an inward facing surface confronting the scanning element, the inward facing surface of the extension of the movable member having a color which is contrasty to the background color provided by the casing so that the scanning element may determine the position of the movable member by scanning the inward facing surface thereof.

2. The control parameter setting device as claimed in claim 1, wherein the movable member comprises a user accessible switch exposed outside the channel so as to be accessible by a user for user-moving between the positions along the channel.

3. A method for setting control parameters of an image input/processing apparatus, comprising the steps of:

(1) providing a user-setting member which is movably received within an elongated channel formed on a casing of the image input/processing apparatus, the user-setting member being movable between at least two positions along the channel and the user-setting member having a first color provided on a surface thereof which first color is in significant color contrast with respect to a second color of the casing;

(2) establishing and storing a plurality of sets of control parameters, each being associated with one of the positions of the user-setting member along the channel;

(3) providing a scanning element inside the casing and confronting the surface of the user-setting member to scan, the surface of the user-setting member and thus determine the position of the user-setting member by means of the color contrast;

(4) retrieving the set of control parameters corresponding to the position of the user-setting member determined by the scanning element; and (5) loading the control parameters into the image input/processing apparatus.

* * * * *